United States Patent
Hennecken

(10) Patent No.: US 7,206,873 B1
(45) Date of Patent: Apr. 17, 2007

(54) THROUGHPUT OPTIMIZATION BY ACTIVATION OF SELECTED PARALLEL CHANNELS IN A MULTICHANNEL TAPE DRIVE

(75) Inventor: Mark A. Hennecken, Parker, CO (US)

(73) Assignee: Storage Technology Corporation, Louisville, CO (US)

( * ) Notice: Subject to any disclaimer, the term of this patent is extended or adjusted under 35 U.S.C. 154(b) by 536 days.

(21) Appl. No.: 10/712,440

(22) Filed: Nov. 13, 2003

(51) Int. Cl.
  *G06F 3/00* (2006.01)
  *G06F 3/06* (2006.01)
  *G06F 12/00* (2006.01)
  *G11B 5/02* (2006.01)
  *G11B 15/04* (2006.01)

(52) U.S. Cl. .......................... 710/58; 710/59; 710/60; 710/61; 711/4; 711/100; 360/18; 360/39; 360/55; 360/69

(58) Field of Classification Search ................. 360/18, 360/39, 55, 69; 710/58, 59, 60, 61
See application file for complete search history.

(56) References Cited

U.S. PATENT DOCUMENTS

| | | | |
|---|---|---|---|
| 5,513,326 A * | 4/1996 | Nute | 710/60 |
| 6,052,744 A * | 4/2000 | Moriarty et al. | 710/27 |
| 6,154,850 A * | 11/2000 | Idleman et al. | 714/5 |
| 2002/0087783 A1* | 7/2002 | Leonhardt et al. | 711/111 |
| 2002/0120797 A1* | 8/2002 | Fabre | 710/60 |
| 2003/0001036 A1* | 1/2003 | Beavers et al. | 242/334.5 |

* cited by examiner

*Primary Examiner*—Kim Huynh
*Assistant Examiner*—Alan S. Chen
(74) *Attorney, Agent, or Firm*—Brooks Kushman P.C.

(57) ABSTRACT

The present invention describes a method and system for adjusting the rate of data transfer between a high-speed multi-channel tape drive and a slower-capability network interface. The present invention allows for selectively enabling/disabling active channels to adjust the data throughput to match the data transfer capabilities of the network interface. Such an adjustment optimizes the rate of data transfer between the system and the tape drive by reducing the amount of stop and start operations normally present in an environment where the network interface cannot support the high-speed data transfer rates of a tape drive. Such an enablement/disablement adjustment system allows for a greater range of varying data rates within the transfer.

22 Claims, 3 Drawing Sheets

THROUGHPUT OPTIMIZATION BY ACTIVATION OF SELECTED PARALLEL CHANNELS IN A MULTICHANNEL TAPE DRIVE

BACKGROUND OF THE INVENTION

1. Field of the Invention

The present invention relates to magnetic tape read/write heads, and more specifically, to selectively activate data channels in a tape drive to optimize data throughput.

2. Background of the Invention

Magnetic tape is a widely used sequential storage medium used for data collection, backup, and historical purposes. Magnetic tape is made of flexible plastic with one side coated with a ferromagnetic material. Tape drives and their corresponding tape media are applied to data storage tasks in all levels of computer data storage from personal computers to workstations to mainframes and supercomputers. Much of magnetic tape's popularity is due to the fact that tape offers the lowest cost per unit of storage and highest volumetric storage efficiency of all available technologies. Tape products are available in many formats from many vendors in a wide range of cost categories.

For information storage and retrieval, magnetic tape has proven especially reliable, cost efficient, and easy to use. In order to make magnetic tape even more useful and cost effective, emphasis has been placed on developing high speed data transfer methods for future tape drives. Many of the newer tape drives can read and write data at very high data transmission rates, which enhances their efficiency with systems and applications that need this capability. However, not all computers/networks or applications can match the data transfer rates generated by this new generation of tape drives. The vast majority of these existing slower-capability infrastructures will still be in use due to the high cost of replacement. Thus, these infrastructures are not necessarily capable of supporting the high data transfer rates from the tape drives under development.

Traditionally, managing problems associated with interfacing a high-speed tape drive to an infrastructure that cannot support the high-speed data transfer rates include using a variable speed control in the tape drive to match the tape drive throughput to the interface. However, there are drawbacks to using this approach, including complicating the speed control and the clock for reading and writing data, as well as being limited by how slow the throughput speed can be set and still maintain proper tape tension and fly height control. Another approach to handle the variance in the drive's transfer rates and the capabilities of the infrastructure is to stop the tape drive when the interface cannot keep up with the tape drive, backup the tape, and then resume the data transfer. However, the data transfer may still overwhelm many of the networks to which the tape drive is attached. This situation can result in continuous stop, backup, and resume operations. Such operations can cause excessive wear on both the tape drive and medium.

Therefore, it would be advantageous to have an improved method and apparatus for optimizing the throughput of a tape drive that overcomes the drawbacks of the prior art.

SUMMARY OF THE INVENTION

The present invention describes a method and system for adjusting the rate of data transfer between a high-speed multi-channel tape drive and a slower-capability network interface. The present invention allows for selectively enabling/disabling active channels to adjust the data throughput to match the data transfer capabilities of the network interface. Such an adjustment optimizes the rate of data transfer between the system and the tape drive by reducing the amount of stop and start operations normally present in an environment where the network interface cannot support the high-speed data transfer rates of a tape drive. Such an enablement/disablement adjustment system allows for a greater range of varying data rates within the transfer.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a system and method for selectively enabling/disabling data channels in order to adjust the rate of data transfer in an environment having a high-speed tape drive interfaced with a slower-capability infrastructure. The mechanism of the present invention selectively enables and/or disables active channels to adjust the data throughput to match the data transfer capabilities of the network interface. Such an adjustment optimizes the rate of data transfer between the system and the tape drive by reducing the amount of stop and start operations normally present in an environment where the network interface cannot support the high-speed data transfer rates of a tape drive. Such an enablement/disablement adjustment system allows for a greater range of varying data rates within the transfer.

Figure 1:
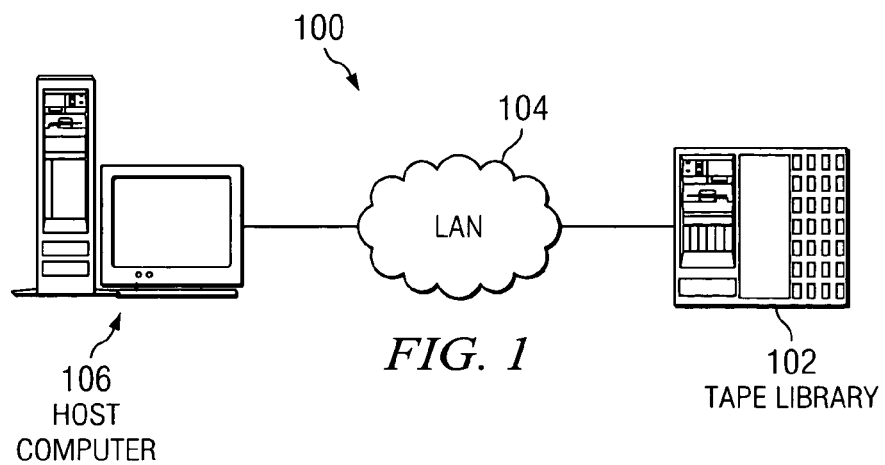
FIG. 1 is a block diagram illustrating components used to store data in accordance with a preferred embodiment of the present invention.

With reference now to FIG. 1, a block diagram illustrating components used to store data in accordance with a preferred embodiment of the present invention is shown. Tape library system 100 is an example of a system in which the mechanism of the present invention may be implemented. Although this diagram depicts a particular tape backup architecture, one of ordinary skill in the art would recognize that the present invention can be employed in any tape backup architecture depending upon the particular environment. In this example, tape library 102 is employed to store data onto a magnetic tape. Tape library system 100 includes tape library 102, network 104, and host computer 106. Network 104 is shown in FIG. 1 as a local area network (LAN). However, network 104 may also be implemented as a number of different types of networks, such as, for example, the internet, an intranet, or a wide area network (WAN).

Figure 2:
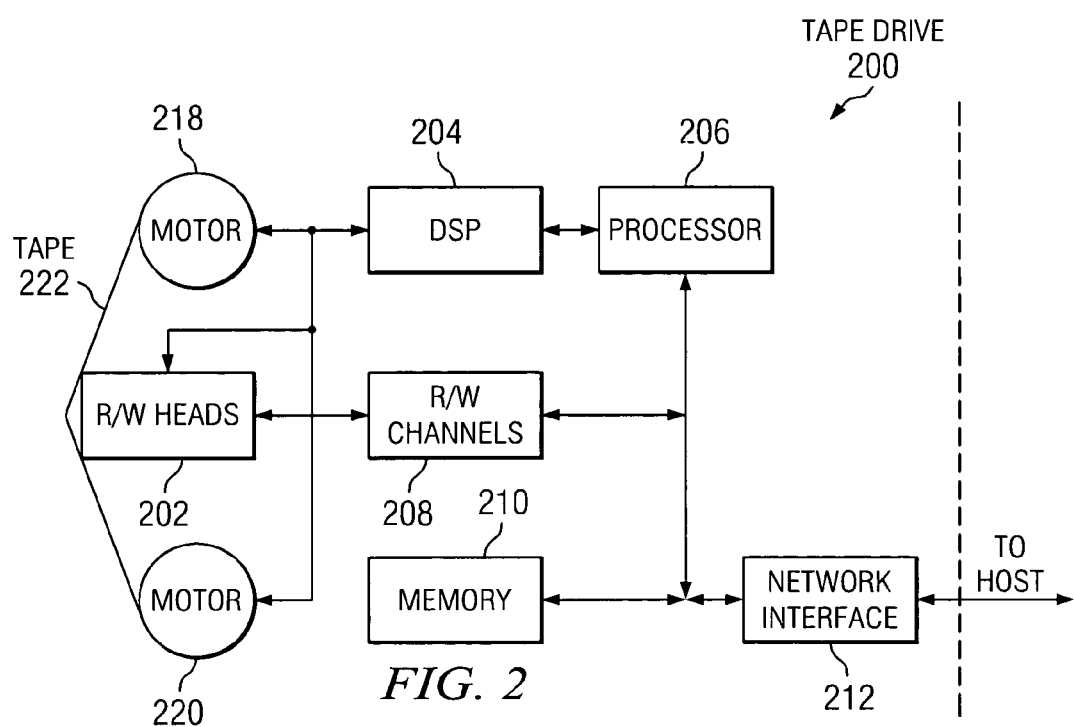
FIG. 2 is a block diagram of a tape drive in accordance with the present invention.

Turning now to FIG. 2, a block diagram of a tape drive, for use in a tape storage library such as tape library 102 in FIG. 1, is depicted in accordance with a preferred embodiment of the present invention. Tape drive 200 is an example of a tape drive system in which the mechanism of the present invention for creating and reading data may be implemented. The mechanism allows for information, such as a format identification block, to be written on a magnetic tape in a manner that allows this data to be read by tape drives implementing different recording formats and track widths.

As illustrated, tape drive 200 includes processor 206, digital signal processor (DSP) 204, read/write (R/W) heads 202, read/write (R/W) channels 208, memory 210, network interface 212, and motors 218–220. Processor 206 executes instructions stored within memory 210 that control the functions of the other components within tape drive 200 such that read and write functions may be executed. Instructions for writing and reading data, such as a format identification block, may be stored in memory 210. Memory 210 is a nonvolatile memory, such as a nonvolatile random access memory.

Processor 206 may be implemented in various ways depending on the particular embodiment. For example, processor 206 may be a microprocessor or may even take the form of an advanced RISC microprocessor (ARM). Specifically, processor 206 executes instructions used to write and read data in a manner that other tape drives may read this data even if those tape drives are designed to read data on tracks having a different track width than tape drive 200.

Network interface 212 provides an interface to allow tape drive 200 to communicate with a host computer or with a host network. Motors 218–220, controlled by digital signal processor (DSP) 204, move tape 222 such that read/write heads 202 can read information from or write information to tape 222. Tape 222 is a magnetic tape in these examples.

During write operations, read-write channels 208 provides for the reliable conversion of digital data into analog signals that drive the elements of read/write head 202. Read/write head 202 creates magnetic patterns on tape 222 as it is moved past. The conversion process includes the generation and appending of error correcting data to the digital data stream that is used during readback to help ensure that data errors are detected and corrected.

During readback, R/W channels 208 processes the analog head signals created by read/write head 202 as tape 222 is moved past read/write head 202. The read/write channels 208 extract the data, detect and correct errors, and provide a digital data stream to processor 206, memory 210, and network interface 212.

Data is recorded on the media as "tracks", each of which is written down the length of the tape by a separate write element and read back by a separate read sensor. The write and read signals to and from each element forms a single data "channel", such as channels 208 in FIG. 2. Depending on where that element is placed across the width of the media, the data in each channel can be written to, or read from, any track recorded on the media.

However, the amount of data that can be transferred from the tape media to network interface 212 is limited by the ability of the infrastructure to support the high-speed data transfer rates. In accordance with a preferred embodiment of the present invention, selectively enabling and/or disabling any number of active channels on the tape can increase the ability of a network interface, which otherwise could not support the high-speed transfer rate, to continuously receive data from the tape without requiring the tape drive to stop, backup, and resume transfer operations.

The present invention lessens the stress placed on the tape drive and media by eliminating or reducing the number of instances when the tape is stopped, backed up, and resumed. Although the present invention can be implemented alone and without prior art methods of controlling data rate transfer, one of ordinary skill in the art would recognize that the present invention can be employed in conjunction with other techniques for optimizing data throughput.

Figure 3:
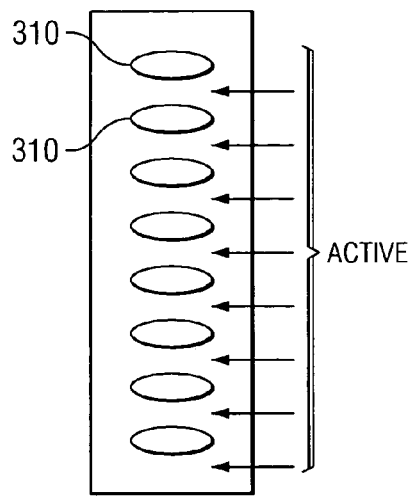
FIG. 3 is a diagram illustrating an example of a tape head configuration in accordance with the prior art.

With reference to FIG. 3, an example of a tape head configuration in accordance with the prior art is shown. Each data channel has a configuration of either "active" or inactive". If the channel is active, data can be transferred using that particular channel. In contrast, if the channel is inactive, that channel cannot be used. As a result, no data can be transferred using that particular channel. For example, FIG. 3 depicts a tape system having, for example, "N" available channels. All of the channels 310 are configured as "active". Having each channel configured as "active" will result in an optimum data transfer rate only if network interface 212, as shown in FIG. 2, is able to supply data fast enough. If network interface 212 cannot meet the transfer capability of drive 200, drive 200 must stop and wait for network interface 212 to catch up to the speed of drive 200.

Figure 4:
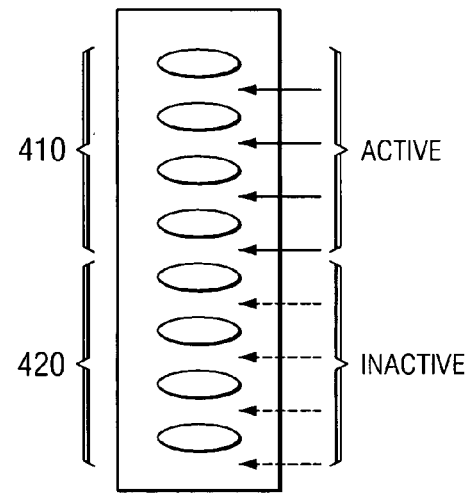
FIG. 4 is a diagram illustrating an example data channel configuration in a tape head assembly in accordance with a preferred embodiment of the present invention.

With reference now to FIG. 4, a diagram of an example data channel configuration in a tape head assembly in accordance with a preferred embodiment of the present invention is shown. FIG. 4 illustrates a single head system using a number (N) of data channels, wherein the network interface is delivering data at a slower speed than needed to keep the drive streaming. Rather than stop the tape drive to allow the network interface to catch up to the speed of the drive, the present invention allows for a number of active channels 410 to be selectively enabled, and/or to disable or inactivate the remainder of the data channels 420 in order to optimize the data throughput.

For example, if the network interface delivers data at half the speed needed to keep the drive streaming, rather than stop the drive, half of the channels could be turned off, or configured to be "inactive". The consequence of reducing the number of active channels to half of the number of channels available is that the tape drive does not need to be stopped, and the data throughput from the network interface to the tape is matched. Thus, the present invention allows for a steady stream of records to be written to the tape without the excessive wear on the tape drive and media due to stopping and starting of the tape.

In addition, the process of selectively enabling and/or disabling the channels can be performed in various combinations. For example, the channels can be enabled or disabled en masse, such as half of the available channels as in the example above. Or the channels can be enabled or disabled in a finely tuned manner, such as controlling the configuration of one channels at a time. One of ordinary skill in the art would recognize that the present invention may be performed using any manner of selection of the channels for enablement/disablement.

Figure 5:
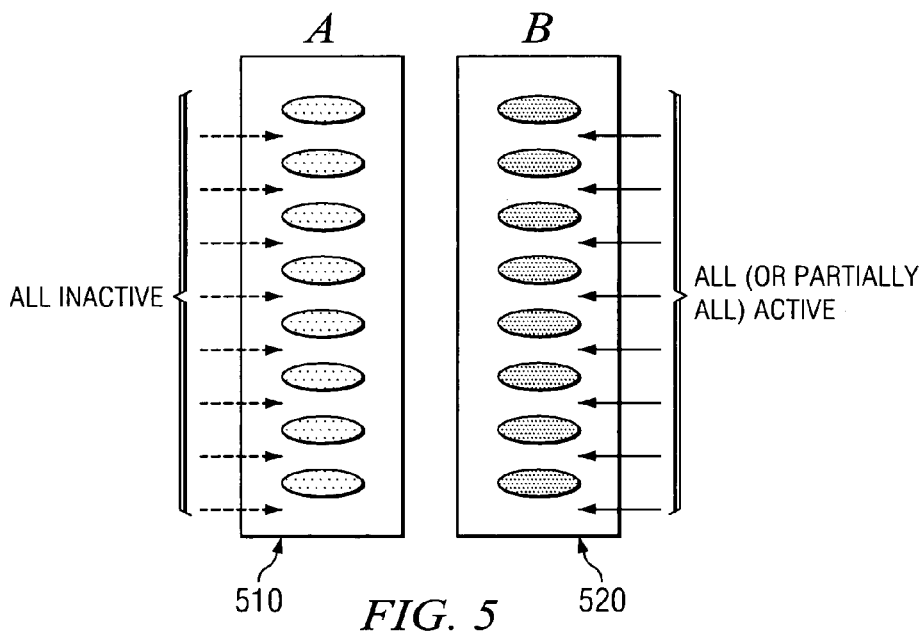
FIG. 5 is a diagram illustrating an example data channel configuration in a multiple tape head assembly in accordance with a preferred embodiment of the present invention.

The present invention may also be implemented in multiple tape head systems. FIG. 5 illustrates how the present invention can be employed using a data channel configurations within a multiple tape head system in accordance with a preferred embodiment of the present invention is shown.

The particular example shown in FIG. 5 consists of a two head system. The number (N) of tracks from the two sections, tape head A 510 and tape head B 520, make up the available data channels in the system. The number of tracks enabled/disabled in the two head system can be determined either on a head basis or on a combination of tracks/head basis.

For example, FIG. 5 illustrates selectively enabling/disabling the channels on a head basis. The data channels in section A 510 are all configured as "inactive", while the data channels in section B 520 are all configures as "active". In contrast, the channels can also be enabled/disabled based on a combination of tracks and head. For example, part of the channels in tape head A 510 can be enabled or "active", and part of the channels in tape head B 520 can also be enabled or "active". Although either approach may be used when enabling data channels in a two head system, from a system architecture viewpoint, it may be easier in a multihead system to enable the channels based on using one head as opposed to enabling half the tracks on one head and half the tracks on another head. Advantages of enabling the channels on one head in a multi head system include reducing power requirements if the unused head was just locked in position with no control. Also, if a single head version of a multihead product were introduced, the single head product could be made to read tapes written with the multihead product. However, a person of ordinary skill in the art will recognize that other configurations of sections to read and write data channels may be used within the scope of the invention.

Implementation of the present invention also requires that the tape cartridge be "marked" as to how the data was written. In other words, the tape cartridge includes information of which channels were selectively enabled and/or disables during the write process. Such information can be written into the media information region (MIR), which contains information identifying the tape, and/or the information can be written into a radio frequency identification (RFID) chip in the cartridge.

Figure 6A:
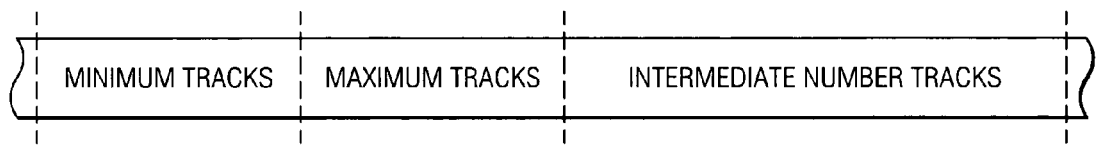
FIGS. 6A through 6C depict examples of marking the tape cartridge to identify the process used to write the data onto to the tape.
Figure 6B:
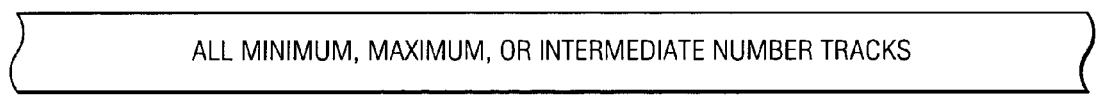
Figure 6C:
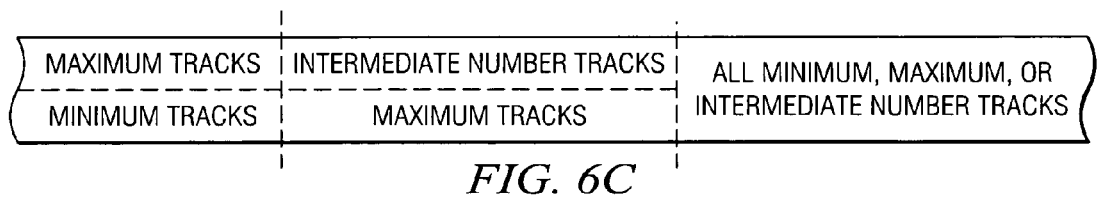

FIGS. 6A through 6C depict examples of different possibilities of how the tape cartridge can be marked to identify how the data was written onto to the tape. In particular, FIG. 6A illustrates the simplest implementation of marking the cartridge. The cartridge can be written as a full speed version only during one part of the cartridge, minimum speed version in a different part of the cartridge, and yet at another speed in another part of the tape. There is no mixing of speeds between these identified portions of the cartridge. FIG. 6B illustrates a cartridge written at only one of the available speeds. FIG. 6C illustrates how the system can be designed to incorporate full speed, minimal speed, and any intermediate speeds in combination for use in writing the tracks.

Thus, the present invention solves the disadvantages of the prior art by providing a system and method for selectively enabling/disabling data channels in order to adjust the rate of data transfer in an environment having a high-speed tape drive interfaced with a slower-capability infrastructure. The advantages of the present invention should be apparent in view of the detailed description provided above. One can eventually transfer data between a tape drive and a network interface using existing methods. However, such a task has proven to be inefficient since typical infrastructures are incapable of keeping up with high-speed tape drives and thus cause multiple stop/start of the drives in order to transfer data. Furthermore, such procedures causes excessive wear on the tape drive and medium. In contrast, the present invention not only increases the efficiency of transferring data between a high-speed tape drive and a slower-capability network interface, but it will also provide for a greater range of varying data rates, thereby optimizing data throughput. The present invention also reducing problems caused by excessive wear on the tape drive and media.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for adjusting the rate of data transfer between a high-speed multi-channel tape drive and an network interface, comprising:
   determining a maximum throughput capability of the network interface;
   selecting a number of active data channels for a single tape medium in the high-speed tape drive, wherein the number of active data channels is selected to match tape drive throughput for the said single tape medium to the maximum throughput capability of the network interface; and
   responsive to selecting a number of active data channels in the tape drive, enabling the selected number of active data channels and disabling a remainder of the data channels.

2. The method in claim 1, further comprising:
   marking the tape cartridge to identify the method used to write data, wherein the marking step includes storing information of which channels were selectively enabled or disabled during the write process.

3. The method in claim 2, wherein the information of which channels were selectively enabled or disabled during the write process is written into the media information region of the tape cartridge.

4. The method in claim 2, wherein the information of which channels were selectively enabled or disabled during the write process is written into a radio frequency identification chip in the tape cartridge.

5. The method in claim 1, wherein adjusting the rate of data transfer is performed dynamically.

6. The method in claim 1, wherein the high-speed tape drive comprises a single head system using a number of data channels.

7. The method of claim 1, wherein the active data channels are selectively enabled and disabled as a group.

8. The method of claim 1, wherein the active data channels are selectively enabled and disabled one channel at a time.

9. The method of claim 1, wherein the high-speed tape drive comprises a multi-head system, each using a number of data channels.

10. The method of claim 9, wherein selecting the number of active data channels to be enabled and disabled in a multi-head system is performed on a tape head basis.

11. The method of claim 9, wherein selecting the number of active data channels to be enabled and disabled in a multi-head system is performed on a combination of channel and tape head basis.

12. A system for adjusting the rate of data transfer between a high-speed multi-channel tape drive and an network interface, comprising:
   determining means for determining a maximum throughput capability of the network interface;
   selecting means for selecting a number of active data channels for a single tape medium in the high-speed tape drive, wherein the number of active data channels is selected to match tape drive throughput for the said single tape medium to the maximum throughput capability of the network interface; and
   responsive to selecting a number of active data channels in the tape drive, enabling means for enabling the selected number of active data channels and disabling a remainder of the data channels.

13. The system according to claim 12, further comprising:
   marking means for marking the tape cartridge to identify the method used to write data, wherein the marking step includes storing information of which channels were selectively enabled or disabled during the write process.

14. The system according to claim 13, wherein the information of which channels were selectively enabled or disabled during the write process is written into the media information region of the tape cartridge.

15. The system according to claim 13, wherein the information of which channels were selectively enabled or disabled during the write process is written into a radio frequency identification chip in the tape cartridge.

16. The system according to claim 12, wherein adjusting the rate of data transfer is performed dynamically.

17. The system according to claim 12, wherein the high-speed tape drive comprises a single head system using a number of data channels.

18. The system according to claim 12, wherein the active data channels are selectively enabled and disabled as a group.

19. The system according to claim 12, wherein the active data channels are selectively enabled and disabled one channel at a time.

20. The system according to claim 12, wherein the high-speed tape drive comprises a multi-head system, each using a number of data channels.

21. The system according to claim 20, wherein selecting the number of active data channels to be enabled and disabled in a multi-head system is performed on a tape head basis.

22. The system according to claim 20, wherein selecting the number of active data channels to be enabled and disabled in a multi-head system is performed on a combination of channel and tape head basis.

* * * * *